Oct. 8, 1940.  F. S. NANNA  2,217,318
MARSHMALLOW WHIPPER
Filed June 14, 1937  3 Sheets-Sheet 1

Inventor:
Frank S. Nanna
By
Williams, Bradbury, McCaleb & Hinkle
Attys.

Oct. 8, 1940.  F. S. NANNA  2,217,318
MARSHMALLOW WHIPPER
Filed June 14, 1937  3 Sheets-Sheet 2
Fig. 2.
Fig. 4.
Fig. 3.
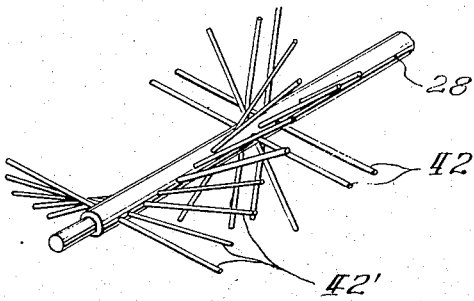
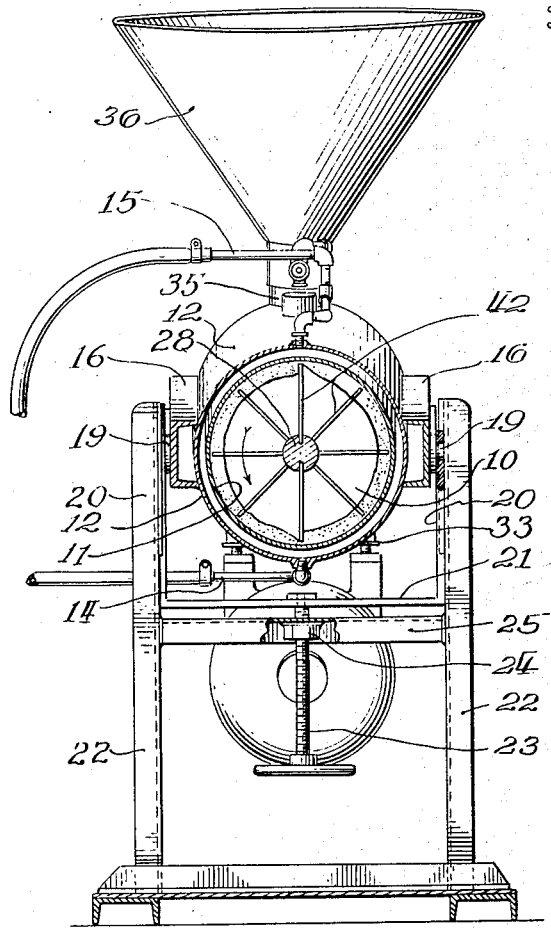
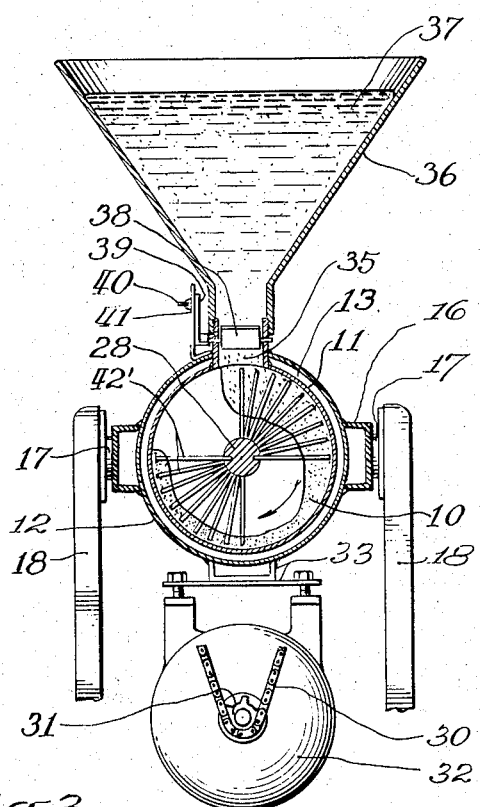
Inventor:
Frank S. Nanna
By Williams, Bradbury, McCaleb & Hinkle
Attys.

Oct. 8, 1940.    F. S. NANNA    2,217,318
MARSHMALLOW WHIPPER
Filed June 14, 1937    3 Sheets-Sheet 3
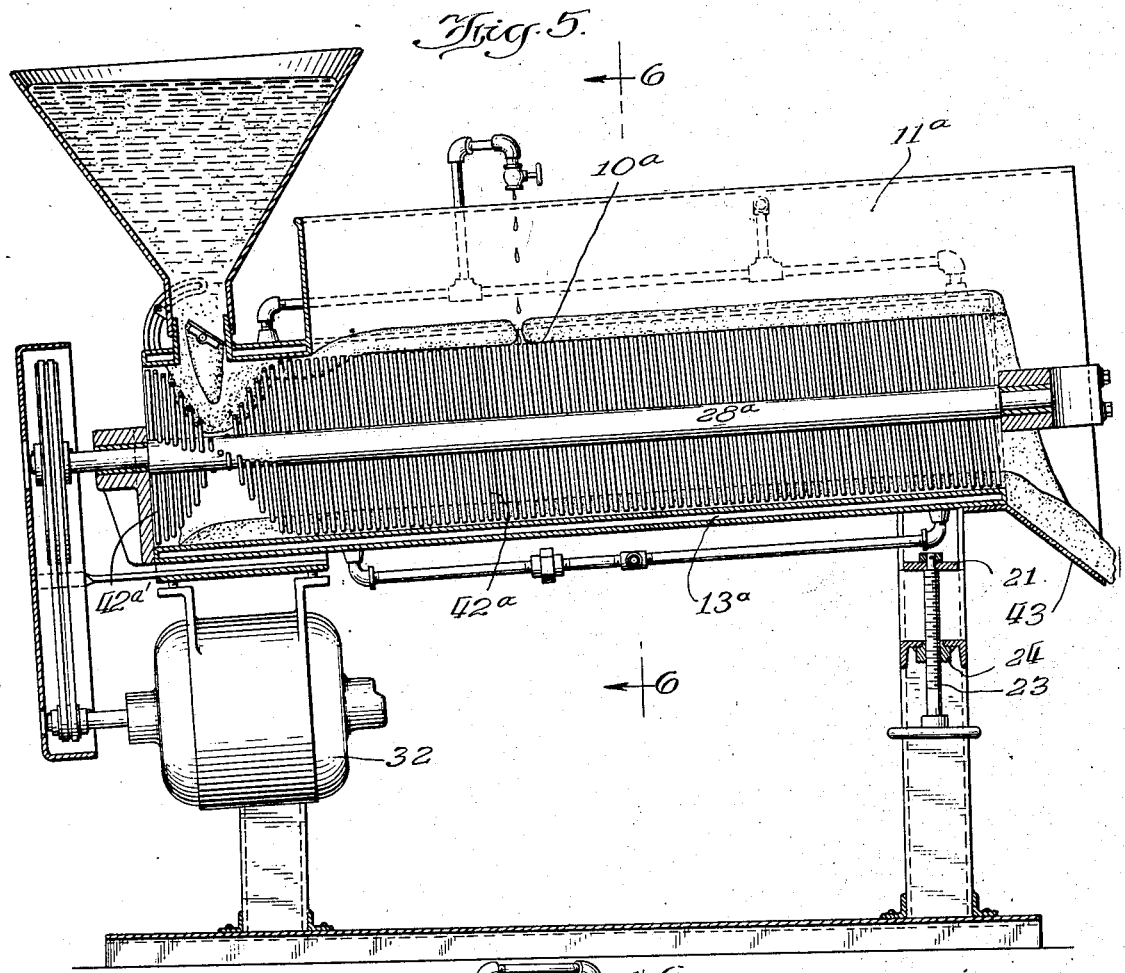
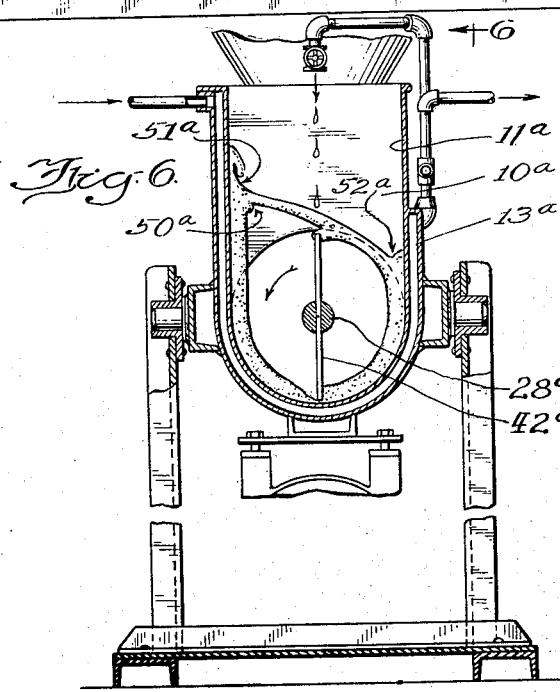
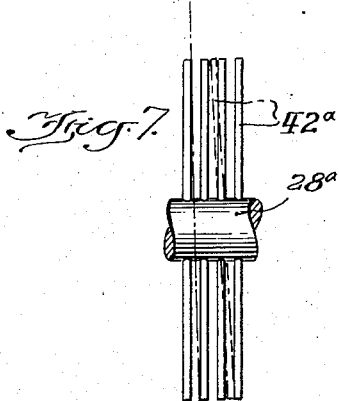
Inventor:
Frank S. Nanna Patented Oct. 8, 1940

2,217,318

UNITED STATES PATENT OFFICE 2,217,318

MARSHMALLOW WHIPPER

Frank S. Nanna, Chicago, Ill.

Application June 14, 1937, Serial No. 148,029

6 Claims. (Cl. 259—7)

My invention relates to marshmallow whippers, and is particularly concerned with a whipper for a marshmallow mix which will whip and aerate the marshmallow to the desired consistency as a continuous process rather than as a batch process.

Different types of marshmallow and different consistencies of marshmallow mix require different durations of whipping. One of the objects of my invention is to provide a marshmallow whipper of the continuous type where the duration of the whipping action to which the mix is subjected may readily be varied as required without the necessity of changing or replacing any of the parts.

Another object is a continuous marshmallow whipper wherein the whipping chamber remains at atmospheric pressure, as distinguished from the whipping air being fed thereto under pressure, and wherein the mix may be fed to and through the whipping chamber by gravity and the centrifugal action of the whipper on the marshmallow, rather than requiring a feed pump or its equivalent.

The marshmallow whipper of my invention is relatively compact and economical to manufacture and maintain and has very few moving parts, yet it has an unusual high output in quantity of marshmallow whipped per hour.

The foregoing together with further objects, features and advantages are set forth in the following description of specific embodiments thereof which are illustrated in the accompanying drawings wherein:

Fig. 2 is a transverse section taken on the line 2—2 of Fig. 1 and looking in the direction of the feed end;

Fig. 3 is a transverse section taken on the line 3—3 at the feed end and looking toward the discharge end;

Fig. 4 is a perspective view of the feed end of the whipper shaft;

Fig. 5 is a vertical longitudinal view somewhat similar to Fig. 1, but showing a modified form of my invention;

Fig. 6 is a transverse section taken on the line 6—6 of Fig. 5 looking toward the feed end; and Fig. 7 is a somewhat diagrammatic enlarged fragmentary view of some of the whipper rods showing their slight angular arrangement.

Figure 1:
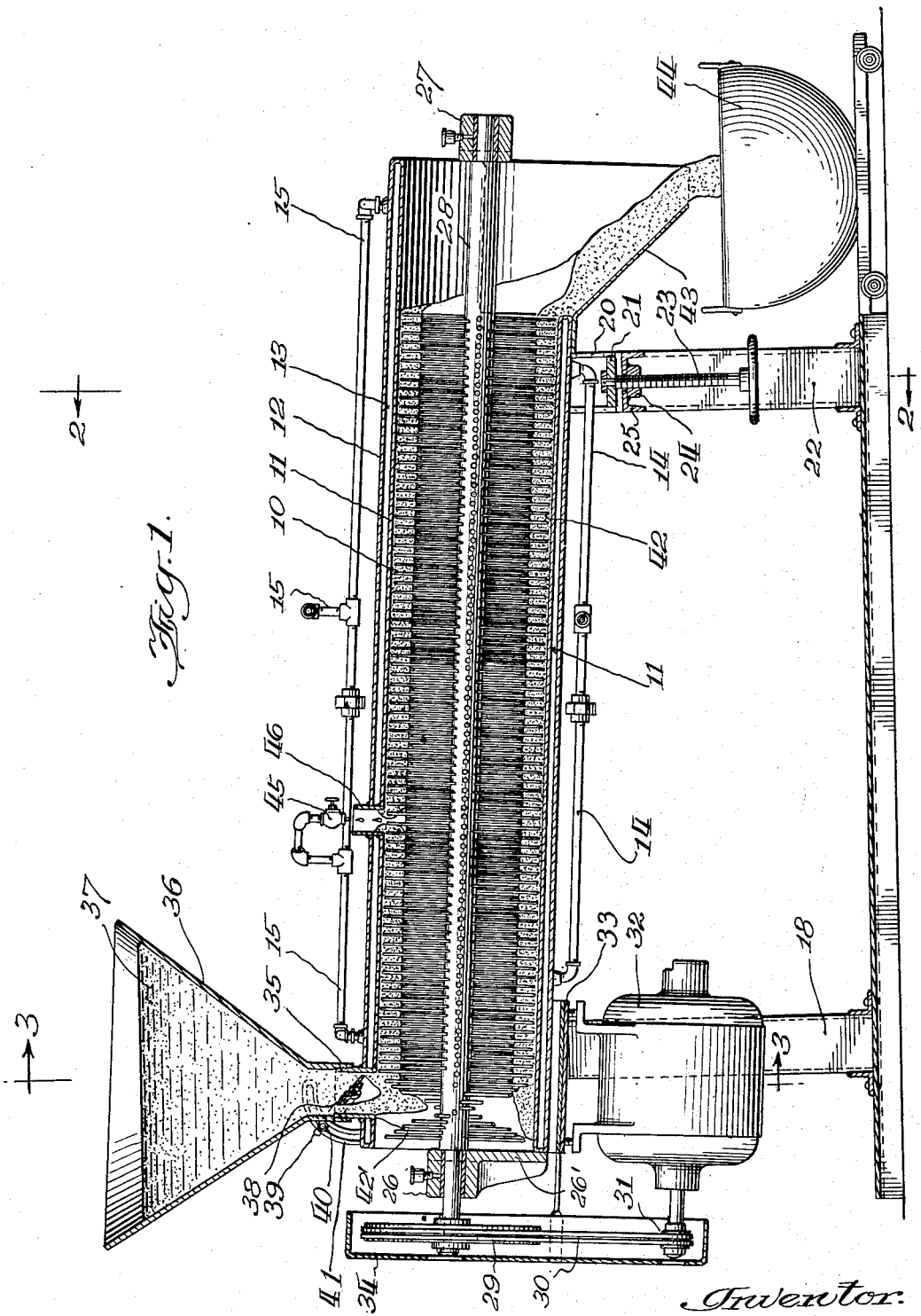
Fig. 1 is a longitudinal vertical section through a marshmallow whipper embodying my invention.

In the form of my invention illustrated in Figs. 1 to 4, inclusive, the whipping chamber 10 is cylindrical and arranged substantially horizontally and formed by an inner cylindrical shell 11. An outer shell 12 forms a jacket 13 for circulating water or other cooling medium. The cooling water is fed by pipes 14 to the lower side of the jacket near each end and is carried away from the jacket by outlet pipes 15 leading from the top side of the jacket.

Near its feed end the outer shell 12 carries lateral brackets 16 having trunnions 17 whereby the body of the whipping chamber is pivotally mounted on a feed end standard 18.

Adjacent its discharge end the body of the chamber carries somewhat similar trunnions 19 pivotally mounted at the upwardly extending legs 20 of a U-shaped subframe or carriage 21, which is slidably mounted in the discharge end standard 22. A hand wheeled screw 23 is threaded in a stationary nut 24 in a cross bar 25 of the standard 22, and is rotatably connected to the web of the U-shaped carriage 21. By turning the hand wheel the screw is raised or lowered in the stationary nut 24 and thereby the U-shaped carriage 21 is raised or lowered in its ways in the standard 20. Thus the discharge end of the chamber body may be raised or lowered, the body pivoting about its trunnioned bearing in the standard 18.

The whipper chamber body at its feed end carries a bearing 26 and at its opposite end a somewhat similar bearing 27. A whipper shaft 28 is journaled in the bearings 26 and 27 and extends throughout the length of the whipping chamber along the axis thereof. The feed end of the shaft 28 protrudes beyond the bearing 26 and carries a pulley or sprocket 29. The pulley 29 is driven through a belt or chain 30 by a small pulley or sprocket 31 on the armature shaft of a motor 32 which is suspended on the underside of the body of the whipping chamber by means of a bracket 33. A guard 34 is preferably bracketed on the chamber body to protect attendants from the drive mechanism. By mounting the motor 32 and the transmission on the body of the chamber, the tilting of the chamber by the screw 23 does not affect the motor or drive and avoids the necessity of any universal joints in the drive.

An inlet passage 35 extends through both shells of the chamber wall at the top side of the feed end thereof. The inlet passage is supplied by a hopper 36 which receives the marshmallow mix 37. The flow of the mix from the hopper through the inlet passage 35 and to the whipping chamber is controlled by a butterfly valve or damper 38.

This may be set for any desired rate of flow by means of an external arm 39 which may be fixed by a thumb screw 40 at any desired angle upon the arcuately slotted quadrant 41 which extends upwardly from the shell 12.

The shaft 28 carries a multiplicity of closely spaced whipping rods 42 arranged radially of the shaft in six different arcuately spaced positions. This spacing and arrangement of the whipping rods obtains for those which lie posteriorly of the inlet, that is, to the right of the inlet passage 35 in Fig. 1. The rods 42 which come opposite and to the left of the inlet passage 35 are not arranged in the same manner, but are arranged to form a spiral, as shown in Figs. 1 and 4. The spiral is so arranged in reference to the direction of rotation of the shaft, that the spirally arranged rods 42' tend to feed the mix toward the right in Fig. 1, rather than allowing the mix to accumulate or be whipped directly opposite the inlet opening.

The rods 42 are shown in Fig. 2 as separate radial rods, but I contemplate that the whipper rods may be formed by double length rods which extend diametrically and through the shaft where an even number of rod positions is employed.

Adjacent its discharge end the underside of the double shelled wall of the whipping chamber is cut away and replaced by a downwardly sloping discharge chute 43 from which the emerging whipped marshmallow is run off into a suitable receiving pan or bowl 44 which may conveniently be mounted on a truck for carrying the whipped marshmallow to the place where it is to be stored or used.

The whipper rods do not extend to the bearing 27, but terminate at the discharge chute 43.

The operation of my whipper in the form shown in Figs. 1 to 4, inclusive, is as follows: Any of the usual types of marshmallow mix may be employed, such as the conventional formula of corn syrup, sugar, water, dissolved gelatin, flavoring and, perhaps, coloring. A cooked mix may be whipped by my device also. In either case the mixing of the ingredients is preferably done before the mix is brought to the whipper.

A supply of the syrupy mix is poured into the hopper 36 from time to time to maintain a supply therein. The feed valve 38 is set on the quadrant 41 to give the desired rate of feed which can best be determined by experiment for any specific mix in relation to the size of the whipper. The mix feeds itself by gravity through the inlet passage 35. The syrupy and stringy mix flowing down through the passage 35 will be caught by the spirally arranged rods 42'. Since the shaft is rotated at a relatively high rate of speed, the rods 42' throw the mix outwardly under centrifugal force, rather than allowing it to accumulate on the shaft itself, or piling up at the bottom arc of the inner shell 11. The spiral arrangement of the rods 42' tends directly to feed the incoming mix to the right and into the region of the rods 42 posteriorly of the inlet passage. If there is any tendency of a thickness of the mix to build up at the region of the inlet passage, the effect of the centrifugal force imparted to it by the rods will cause any such annulus to spread itself out longitudinally of the inner shell 11, and this action supplements the spiral arrangement of the rods 42' in feeding the mix to the right in Fig. 1 and into engagement by the rods 42.

The spiraled rods 42' preferably start somewhat to the left of the inlet passage 35 to prevent mix from piling up in that end. The bracket for the bearing 26 includes a web portion 26' which covers the bottom half of the otherwise open left-hand end of the chamber body further to preclude any mix from passing out that way.

As soon as the mix is engaged by the rods 42 they impart such a degree of centrifugal force to the mix that the mix is thrown outwardly and maintained in contact with the inner shell 11, as shown in Fig. 1. In this way practically none of the mix or whipped marshmallow is permitted to come in contact with the shaft itself or in contact with the rods 42 save at their outer regions.

The surface adhesion of the relatively sticky and stringy marshmallow mix, or later, of the whipped or partially whipped marshmallow, to the inner surface of the cylindrical shell 11 holds it back from circulating around the whipping chamber at anywhere near the speed of rotation of the whipper rods, even though the material does move fast enough to hold itself out as a layer under centrifugal force. Because of this fact the outer portions of the rods travel through the material and momentarily form a pocket behind each rod. The suction created by the formation of the pocket behind the rod draws in air from the central region of the whipping chamber 10. As the marshmallow material pushes itself together to close up the pocket, the air which has been sucked thereinto is entrained as bubbles. The relatively small diameter of the rods adjacent their outer ends, and the speed at which they travel through the material, results in the air bubbles thus entrained being very small, as is desirable in a well whipped marshmallow. The beating action of the rods and their relative close spacing serves to break up any relatively large bubbles, so that the bubbles are all sufficiently minute and reasonably uniform in size by the time the completely whipped marshmallow emerges from the discharge end of the whipper.

If the outer ends of the rods 42 or substitute whipping elements were relatively broad or paddle-like, they would entrain bubbles which were too large, and their subsequent beating action in reducing the bubbles would result in too much beating and the marshmallow would be "knocked down" so that it would not emerge with the required lightness or fluffiness.

I have found that the large number of rather closely spaced and small diameter whipping elements revolving at high speed, initially entrain air bubbles which are sufficiently small so that with the incidental beating which the partially aerated marshmallow receives, the completely whipped marshmallow is discharged with a high degree of fluffiness and without the marshmallow beaten down so that it is again too solid and tough.

To avoid the danger of having the mix initially too thin or watery, I prefer in practice to use a mix which is calculated to be a little thicker than is required, and then compensate for that lack of water by adding a small component of water. This addition of the water is preferably effected after the marshmallow has been partially whipped and aerated. For this purpose I provide a water supply controlled by a valve 45 which permits water to drop at a controlled rate of speed through a passage sleeve 46 into the whipping chamber 10 at a point about one-third of the distance toward the discharge end. If the water is used as the cooling medium for the jacket 13, the valve 45 may be conveniently tapped into that source. Once the whipper is in operation, the valve 45 may be manipulated to increase or decrease the feed of additional water, depending upon an inspection of the emerging whipped marshmallow. In that way the marshmallow is given the required water content for the desired physical characteristic of whipped marshmallow. If one undertook to provide the exact water content in compounding the mix, there would be danger that too much water would be included, and in that event there would be no way of subtracting the excess water.

There are three or four factors which contribute to urge the marshmallow from the inlet and toward the discharge end of the whipping chamber. One is the spiral arrangement of the rods 42', which initially feeds the mix to the rods 42 where the centrifugal force tends to even out the thickness of the layer and thereby gradually move the marshmallow toward the discharge end. Another is the slight feed screw action of the somewhat spirally arranged rods 42'. With the six different radial positions of the rods 42, as shown in Fig. 2, if the positions are arranged in the proper sequence, each successive rod tends to urge the marshmallow which it contacts a little farther toward the discharge end of the whipping chamber. Primarily, however, I rely upon a slight axial inclination of the whipping chamber. This may be adjusted by the screw 23, as previously described. The greater the inclination the faster the marshmallow will flow through the whipper and the less the whipping to which it is subjected. The rate of flow through the whipper and consequently the amount of whipping which the marshmallow receives can thus be regulated according to the requirements of the particular mix.

It may even occur that with certain types of mixes and with certain feed properties of the spirally arranged rods 42', the marshmallow will go through the whipping chamber too quickly, even when it is in exactly horizontal position. In such case, the screw 23 may be adjusted to give the chamber a slight upward inclination further to check the rate of flow and permit enough whipping action on the marshmallow. For most purposes, however, the whipper is operated substantially in the position shown in Fig. 1.

The several adjustments to which the whipper is ordinarily subjected may be effected while the device is in operation and without requiring a pause in the operation to effect adjustments. By observing the consistency in quality of the emerging whipped marshmallow, the attendant can make indicated adjustments of the inclination of the whipping chamber, the water feed through the valve 45 and the mix feed through the feed valve 38, and these can from time to time be varied until the exact adjustment of each is procured to give the exact quality of marshmallow desired.

The hopper 36 may be filled with mix from time to time, although in practice it is desirable to maintain the level within reasonable limits so that the feed through the portage of the valve 38 is not abnormally affected by the head of mix in the hopper.

I have found that a variable speed drive between the motor and whipper shaft 28 is not necessary in practice, in view of the other adjustments afforded, and I find it satisfactory to change the relative sizes of the pulleys or sprockets 31 and 29 if a change in speed of the shaft becomes necessary. For most purposes a constant speed motor 32 is satisfactory, although the motor may be controlled by a rheostat for varying the speed of the shaft within certain limits.

In the modified form of Figs. 5, 6 and 7, the whipper and its details are generally similar, except for the arrangement of the whipper rods 42a and the use of an open topped whipping chamber 10a instead of a cylindrical chamber.

The body of the whipping chamber 10a, as shown in Fig. 6, is U-shaped in cross section. The inner shell 11a extends considerably above the path of the rods 42a to insure against throwing marshmallow out of the open top. Because of the peculiar position assumed by the marshmallow being whipped, the cooling jacket 13a need not extend so high on the right side (Fig. 6) as on the left side. At the feed end of the whipping chamber and for a short distance therefrom, the chamber is preferably cylindrical, as it is in the form of Fig. 1, but posteriorly thereof, as best shown in Fig. 5, the whipping chamber 10a is open topped with parallel vertical walls extending upwardly from a semi-cylindrical bottom.

Whipper rods of the arrangement of Fig. 1 may be employed in the form of Fig. 5, but I have shown a different arrangement in Fig. 5. This arrangement may be used in the chamber of Fig. 1, and I consider it preferable for use with the open top whipping chamber. As in the form of Fig. 1, the whipper rods 42a are of radial length extending almost to the arcuate surface of the whipping chamber. But instead of having the whipper rods arranged in sets of three or more different radial positions as in Fig. 1, they are confined to but two opposed radial positions. The rods may conveniently be of double length with each rod extending diametrically through the shaft 28a. The rods 42a may all be disposed in the same plane, except that at the feed end the rods 42a' are spirally arranged, as shown, to feed the incoming mix to the right in Fig. 5. The spiralled rods 42a' are shown as describing a half turn, but this may be increased or decreased.

As indicated in Fig. 7, the rods 42a are not exactly at right angles to the axis of the shaft, but at a slight angle therefrom. Preferably the rods are spaced apart by a distance equal to their diameters and their inclination is such that in turning through 180° the ends of the rods come intermediate the positions they occupied at the start. This is indicated by a comparison of the full line and dotted line positions in Fig. 7, and the inclination is indicated by reference to the dot and dash line which is at exactly right angles to the axis of the shaft.

Because the ends of the rods alternate the position at which they contact a given region of marshmallow at each half revolution, the aeration of the marshmallow by the pockets momentarily formed behind each rod end is advantageously distributed instead of continuously tracking or coming at the same place.

When the whipper is in operation, a cross section through the whipping chamber in the form of Fig. 1 reveals the marshmallow as a substantially true annulus or circular layer along the inner surface of the chamber, as shown in Fig. 2. With the forms of Figs. 5 and 6, where the top of the whipping chamber 10a is open, the layer of marshmallow is distorted out of the circular and assumes a position substantially as shown in Fig. 6. The exact form of the layer of marshmallow depends, of course, upon the rate of feed of the mix, the consistency thereof, the rate of axial flow thereof, the degree of aeration at the point where the section is taken, the speed of rotation, and such factors.

One advantage of reducing the number of arcuately spaced positions of rods is that a greater period of time is provided, as to any specific region of marshmallow, during which the marshmallow at that region may readjust itself. This is particularly true as to regions near the top arc of the layer of marshmallow. During the slight interval between its engagement by one set of rod ends and its engagement by the diametrically opposite set of rod ends, the marshmallow falls a little and is thereby engaged in a slightly different radial position by the next set of rod ends. This makes for some turning over of the marshmallow in conjunction with the aerating action as provided in the form of Fig. 1. The time interval, however, is not sufficiently great to preclude centrifugal action in holding the marshmallow out in its layer-like tubular form, even though the tubular form is not truly cylindrical.

One advantage in the use of the open topped whipping chamber is that the confluence of the obliquely directed top portion of the layer with its descending wall portion entrains air in the marshmallow also. This is indicated at 50a. Likewise, the marshmallow tends to build up along the impacted side wall and fall down upon itself, entraining additional air at the region 51a. To a lesser extent a similar action obtains at the point 52a.

In general, the rod arrangements and whipping chamber arrangement of Fig. 5 provides more lifting action upon the marshmallow and more entrainment of the air therein than is obtained in the form of Fig. 1, and for this reason the form of Fig. 5 is preferable for many types of marshmallow.

While I have thus described and illustrated specific embodiments of my invention, I contemplate that many changes and substitutions may be made without departing from the scope or spirit of my invention.

I claim:

1. A whipper for aerating marshmallow comprising a body forming an elongated whipping chamber having a semi-cylindrical bottom, a shaft disposed in the whipping chamber along the axis of the semi-cylindrical bottom, means for journaling the shaft, a multiplicity of narrow free ended whipper rods carried by the shaft and extending radially thereof and terminating close to the semi-cylindrical bottom of the chamber, means for continuously supplying marshmallow mix to the chamber near one end thereof, means for rotating the shaft at such speed that the rods impart sufficient rotation to the marshmallow to cause the marshmallow under centrifugal force to assume a tubular form into the material of which the narrow free ends of the rods extend, the chamber having an opening at one end so that the interior of the tubular form of marshmallow is in free communication with atmospheric air to supply air interiorly thereof at atmospheric pressure for entrainment in the marshmallow behind the ends of the rods as they pass through the marshmallow, and an outlet for whipped marshmallow adjacent the other end of the whipping chamber, the whipper including means for urging the marshmallow from the feed end to the discharge end as a continuous process.

2. A whipper for aerating marshmallow comprising a body forming an elongated whipping chamber having a semi-cylindrical bottom, a shaft disposed in the whipping chamber along the axis of the semi-cylindrical bottom, means for journaling the shaft, whipper members carried by the rod and presenting a multiplicity of more or less radially arranged narrow free-ended rod-like elements terminating close to the semi-cylindrical bottom of the chamber, means for continuously supplying marshmallow mix to the chamber near one end thereof, drive means rotating the shaft at such speed that the rods impart sufficient rotation to the marshmallow to cause the marshmallow under centrifugal force to assume a tubular form into the material of which the terminal ends of the rod-like elements extend, the chamber being open-ended at one end to provide free communication with the interior of the tubular form of marshmallow for atmospheric air at atmospheric pressure to provide air for entrainment in the marshmallow behind the ends of the elements as they pass through the marshmallow, and an outlet for whipped marshmallow adjacent the other end of the whipping chamber, the whipper including means for urging the marshmallow from the feed end to the discharge end as a continuous process.

3. A whipper for aerating marshmallow comprising a body forming an elongated whipping chamber with a semi-cylindrical bottom, a shaft disposed within the whipping chamber along the axis of its semi-cylindrical bottom, means carried by the body for journaling the shaft, a motor mounted on the body, drive means interconnecting the motor and shaft, a multiplicity of whipper rods carried by the shaft and distributed substantially throughout the length of the whipping chamber to urge the marshmallow mix toward the discharge end and terminating as spaced narrow free ends close to the semi-cylindrical bottom of the chamber, means for continuously feeding marshmallow mix to the whipping chamber adjacent one end thereof, a discharge port for whipped marshmallow adjacent the other end of the chamber, the shaft being driven by the motor at such speed that the whipper rods impart rotary motion to the marshmallow sufficient to cause it to assume, under centrifugal force, a generally tubular form into the material of which the ends of the rods extend, means in said body for venting the interior of the tubular form of marshmallow to the atmosphere whereby air at atmospheric pressure may be entrained in the marshmallow behind the ends of the rods as they pass through the marshmallow, force feed means included in the whipper and constructed and arranged to urge the marshmallow from the feed end toward the discharge end of the chamber, and a support for the body including means for adjustably supporting the body, shaft, motor, and drive means as a unit with the semi-cylindrical bottom at an adjustable upward inclination from feed to discharge end, whereby adjustably to counteract and check the progressing urge of said force feed means.

4. A whipper for aerating marshmallow comprising a body forming an elongated cylindrical whipping chamber, a shaft disposed in the whipping chamber along the axis thereof, means for journaling the shaft, a multiplicity of narrow free ended whipper rods carried by the shaft and extending radially thereof and terminating close to the cylindrical wall of the chamber, means for continuously supplying marshmallow mix to the chamber near one end thereof, means for rotating the shaft at such speed that the rods impart sufficient rotation to the marshmallow to maintain the marshmallow as a cylindrical layer about the wall of the whipping chamber with the rods extending into the marshmallow layer, the interior of the cylindrical layer of marshmallow being in free communication with atmospheric air to supply air interiorly thereof at atmospheric pressure for entrainment in the marshmallow behind the ends of the rods as they pass through the marshmallow, an outlet for whipped marshmallow adjacent the other end of the whipping chamber, the whipper being constructed and arranged to urge the marshmallow from the feed end to the discharge end as a continuous process.

5. The art of continuously treating marshmallow mix to produce whipped aerated marshmallow of a high degree of fluffiness which comprises the steps of continuously feeding marshmallow mix to a whipping region, rapidly rotating the mix about a generally horizontal axis, one end of which is adjacent the in-feeding of the mix, within the said region while confining it peripherally in reference to its axis of rotation so as to cause the mix to assume the form of a substantially open-ended tubular layer due to centrifugal force, simultaneously whipping air into the mix, admitting atmospheric air to the interior of the tubular layer in unrestricted quantities to provide an adequate supply of air for aerating said mix, simultaneously urging the marshmallow of said tubular layer axially thereof away from the in-feeding of the mix and discharging the marshmallow thus whipped and aerated adjacent the end of the axis opposite the in-feeding.

6. A whipper for aerating marshmallow comprising a body forming an elongated whipping chamber having a semi-cylindrical bottom arranged in a generally horizontal position, a shaft disposed in the whipping chamber along the axis of the semi-cylindrical bottom, means for journaling the shaft, whipper members carried by the rod and presenting a multiplicity of more or less radially arranged free-ended rod-like elements terminating close to the semi-cylindrical bottom of the chamber, means for continuously supplying marshmallow mix to the chamber near one end thereof, drive means rotating the shaft at such speed that the rods impart sufficient rotation to the marshmallow to cause the marshmallow under centrifugal force to assume a tubular form within the chamber, into the material of which tubular form the terminal ends of the rod-like elements extend, the whipper including means affording free access of air at atmospheric pressure to the interior of the tubular form from without the whipper to provide air for entrainment in the marshmallow behind the ends of the elements as they pass through the marshmallow, and an outlet for the whipped marshmallow adjacent the other end of the whipping chamber.

FRANK S. NANNA.